United States Patent Office 3,081,231
Patented Mar. 12, 1963

3,081,231
APPETITE SUPPRESSANT MIXTURE HAVING DECREASED SIDE EFFECTS
Edwin E. Hays and Bernard A. Becker, Rochester, N.Y., assignors to Wallace & Tiernan Inc., a corporation of Delaware
No Drawing. Filed Oct. 27, 1960, Ser. No. 65,283
9 Claims. (Cl. 167—65)

The invention relates to pharmaceutical preparations, and more particularly to pharmaceutical preparations comprising appetite suppressants of the phenalkyl amine and substituted phenalkyl amine type mixed with certain 4-(3H)-quinazolones, the compounds being present as the free bases or their therapeutically useful acid addition salts. Acid addition salts include the common salts such as the chlorides, sulphates, phosphates, and also the complex salts or resinates obtainable by reacting the free base with a cation exchange resin.

Amphetamine and its pharmaceutical useful addition salts, and also phenyl tertiary butyl amine, now called by the generic name phenteramine, and its pharmaceutical useful addition salts are well known effective appetite suppressants. These materials, however, particularly in high dosage amounts, have undesirable side effects, the side effect commonly complained of being dryness of the throat or mouth.

An object of this invention is to provide an effective appetite suppressant composition having reduced side effects such as dryness of the throat.

Another object is to provide an appetite suppressant which remains effective as an appetite suppressant over a longer period of continued use by the patient than does amphetamine or phenteramine.

These and other advantages of the invention are attained by mixing the amphetamine and/or phenteramine appetite suppressant with one or more of the following compounds: 2 - methyl - 3 - orthotolyl - quinazolone (methaqualone), 2-methyl-3-orthotrifluoromethyl phenyl quinazolone, 3-orthotrifluoromethyl phenyl quinazolone, and their pharmaceutically useful salts. Methods of making the above mentioned trifluoromethyl substituted quinazolones are disclosed in the application of Shetty, Hays, and Campanella, Serial No. 13,690, filed March 9, 1960.

The ratio of the amphetamine or phenteramine to quinazolone compound is not critical. Suitable ranges are 1:40 amphetamine or phenteramine to quinazolone compound, and 2:1 amphetamine or phenteramine to quinazolone.

The preferred composition is the sulphonic acid cation exchange resin having amphetamine or phenteramine adsorbed thereon mixed with one or more of the aforesaid quinazolone compounds. The cross-linkage, particle size and degree of saturation of these adsorbable compounds is preferably such that the release with gastric juice is not more than 50% in one hour as described in Keating application Ser. No. 726,010, now Patent 2,990,332.

This allows the oral administration of a unit dose of 5–40 milligrams of amphetamine or phenteramine as the resinate and from 20 to 200 milligrams of the quinazolone compound, giving a sustained release preparation which can be administered once in eight to twelve hours, and which is therapeutically effective and safe during this period of time.

Suitable ranges of dosage amounts for the sustained release of amphetamine or phenteramine sulphonic acid cation exchange resinates mixed with the quinazolone compound are 5 to 40 milligrams of amphetamine or phenteramine as the resinate; and 20–100 milligrams of 2-methyl-3-orthotolyl quinazolone in the form of its free base or salts, or 20–200 milligrams of either or both of the trifluoromethyl phenyl quinazolones in the form of their free bases or salts.

The quinazolones suitably need not be present as the sulphonic acid resinate, although they can be so present. They are slow enough acting, however, that they can be used as the free base, common salt, or the carboxylic acid cation exchange resinate.

However, the amphetamine and phenteramine are preferably present as the resinate or resin complex with a sulphonic acid cation exchange resin. The Amberlite IR–120 resin referred to in the examples below is a polyvinyl aryl sulphonic acid cation exchange resin cross-linked to 7–8% and having a particle size of −20 to +40 mesh.

The amphetamine or phenteramine in an aqueous suspension of this resin is agitated and reacts to form the complex salt or resinate. Other degrees of cross-linkage and particle size sulphonic acid cation exchange resins may be used, it being understood that the larger the particle size and the higher the cross linkage, the slower the rate of release of the drug in the stomach and intestines.

Carboxylic acid cation exchange resins may also be used where slow release is not desired, but in general compounds of this type have little advantage over the free base or common salt.

The mixture of drugs can of course be mixed with pharmaceutically acceptable fillers, but particularly when the resinates are used the amount of filler can suitably be small or even omitted. The amphetamine or phenteramine can suitably be from about 2% to 35% by weight of its adsorption compound.

The composition is orally administered. It is generally manufactured and sold in capsules, but can also be used in the form of tablets or suspensions.

The following examples illustrate the invention:

Example 1

|  | Per capsule |
|---|---|
| dl-Amphetamine as Amberlite IR–120 resin complex _____mg__ | 10 |
| d-Amphetamine as Amberlite IR–120 resin complex _____mg__ | 10 |
| "Tuazole" (methaqualone)_____mg__ | 100 |
| Magnesium stearate_____percent__ | 1 |
| Spray-dried lactose, q.s. | |

Example 2

| | |
|---|---|
| Phenteramine as Amberlite IR–120 resin complex _____mg__ | 30 |
| Tuazole _____mg__ | 75 |
| Talc _____percent__ | 2 |
| Magnesium stearate _____do____ | 2 |
| Dicalcium phosphate_____do____ | 7.5 |
| Spray-dried lactose, q.s. | |

It is contemplated that the above mentioned quinazolones will give decreased side effects for other appetite suppressants such as phenmetrazine, desoxy ephedrine, parachlorphenyl tertiary butylamine, methoxy phenyl tertiary butylamine, and methylene dioxy phenyl tertiary butylamine, and a benzoyl triethylamine, and their pharmaceutically useful salts.

It is claimed:

1. A pharmaceutical composition suitable for use as an appetite suppressant consisting essentially of a substance selected from the group consisting of amphetamine, phenteramine and their pharmaceutically useful acid addition salts and a substance selected from the group consisting of 2-methyl-3-orthotolyl-4-quinazolone, 2-methyl- 3-orthotrifluoromethyl phenyl-4-quinazolone, 3-orthotrifluoromethyl phenyl-4-quinazolone and their pharmaceutically useful addition salts.

2. An appetite suppressant composition consisting essentially of amphetamine adsorbed on a sulphonic acid cation exchange resin and 2-methyl-3-orthotolyl quinazolone.

3. An appetite suppressant composition consisting essentially of phenteramine adsorbed on a sulphonic acid cation exchange resin and 2-methyl-3-orthotolyl quinazolone.

4. An appetite suppressant composition in dosage unit form consisting essentially of 5–40 milligrams of amphetamine adsorbed on a sulphonic acid cation exchange resin and 20–100 milligrams of 2-methyl-3-orthotolyl quinazolone.

5. An appetite suppressant composition in dosage unit form consisting essentially of 5–40 milligrams of phentaramine adsorbed on a sulphonic acid cation exchange resin and 20–100 milligrams of 2-methyl-3-orthotolyl quinazolone.

6. An appetite suppressant composition in dosage unit form consisting essentially of 5–40 milligrams of amphetamine adsorbed on a sulphonic acid cation exchange resin and 20–200 milligrams of 2-methyl-3-orthotrifluoromethyl phenyl quinazolone.

7. An appetite suppressant composition in dosage form consisting essentially of 5–40 milligrams of phenteramine adsorbed on a sulphonic acid cation exchange resin and 20–200 milligrams of 2-methyl-3-orthotrifluoromethyl phenyl quinazolone.

8. An appetite suppressant composition in dosage form consisting essentially of 5–40 milligrams of amphetamine adsorbed on a sulphonic acid cation exchange resin and 20–200 milligrams of 3-orthotrifluoromethyl phenyl quinazolone.

9. An appetite suppressant composition in dosage form consisting essentially of 5–40 milligrams of phenteramine adsorbed on a sulphonic acid cation exchange resin and 20–200 milligrams of 3-orthotrifluoromethyl phenyl quinazolone.

References Cited in the file of this patent
FOREIGN PATENTS
843,073    Great Britain _____ Aug. 4, 1960

OTHER REFERENCES

Kracker: J. Ind. Chem. Soc. 28: 6, 1951, pp. 344–346.

Gujral: Ind. J. Med. Res., 43: 4, October 1955, pp. 637–641.

Salimath: J. Indian Chem. Soc., 33: 2, 1956, pp. 140–142.

American Drug Index, J. B. Lippincott, Phila., Pa., 1958, pp. 43–46.

Becker: Toxicology and Applied Pharm 1: 1, January 1959, pp. 42–54.